United States Patent Office 3,152,182
Patented Oct. 6, 1964

3,152,182
1,4-BIS(DISUBSTITUTED BENZYLAMINO-METHYL)-CYCLOHEXANES
Leslie G. Humber, Montreal, Quebec, Canada, assignor to American Home Products Corporation, New York, N.Y., a corporation of Delaware
No Drawing. Filed June 21, 1962, Ser. No. 204,049
15 Claims. (Cl. 260—570.5)

This invention relates to certain new chemical compounds and their preparation. More particularly, it relates to the novel chemical compounds which, in base form, may be represented generically by the structural formula:

where $R_1$ and $R_2$ are each selected from the group of radicals consisting of methyl, methoxy, benzyloxy and chloro.

The two substituents in each of the terminal phenyl groups, which substitutents may be the same or different radicals, may be positioned with respect to each other in any of the three possible positions, i.e. ortho, meta, or para, one with respect to the other.

Typical chemical compounds falling within this generic definition include the following: 1,4-bis-(2-chloro-6-methylbenzylaminomethyl)-cyclohexane; 1,4-bis-(2-chloro-5-methylbenzylaminomethyl)-cylohexane; 1,4-bis-(3,4-dimethoxybenzylaminomethyl)-cyclohexane; 1,4-bis-(3,4-dibenzyloxybenzylaminomethyl)-cyclohexane; 1,4-bis-(2,6-dichlorobenzylaminomethyl)-cyclohexane; 1,4-bis-(2,4-dichlorobenzylaminomethyl)-cyclohexane; and 1,4-bis-(3,4-dichlorobenzylaminomethyl)-cyclohexane, as well as their salts. Also included as part of my invention are the salts of these bases with pharmaceutically-acceptable, non-toxic acids, particularly acid addition salts with such acids, among which the acid addition salts with hydrohalic acids are especially preferred.

Biological activities, as discussed hereinafter, are characteristic of both base and salt forms of the new compounds.

The invention is also directed to the process by which the new chemical compounds may be prepared from readily-available starting materials.

The new chemical compounds, both in base form and in the form of their acid addition salts with pharmaceutically-acceptable, non-toxic acids, are useful for a number of purposes. They are, for example, capable of being utilized in medicine to inhibit the biosynthesis of cholesterol; as agents to lower the cholesterol content of the blood; and as agents effective against various microorganisms. For the latter purpose various of the compounds are useful as antibacterial agents; others are useful as trichomonicidal agents, while others are effective against fungi and may be used as antifungal agents.

In preparing these compounds it is preferred to react 1,4-bis-(aminomethyl)-cyclohexane with a substituted benzaldehyde, the benzaldehyde being suitably substituted with methyl, methoxy, benzyloxy and/or chloro groups so as to result in the desired new compounds. Thus the benzaldehyde utilized should be one having the following formula:

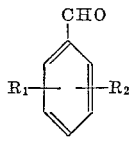

where $R_1$ and $R_2$ have the above-defined significance, i.e. represent methyl, methoxy, benzyloxy or chloro. These groups, as pointed out above, may be positioned with respect to each other in any of the three possible positions, i.e. ortho, meta, or para, one with respect to the other.

Two molar equivalents of the appropriate disubstituted benzaldehyde are reacted, usually with heating, with one molar equivalent of 1,4-bis-(aminomethyl)cyclohexane, thereby removing two molar equivalents of water. The reaction is preferably carried out in an organic solvent, such as benzene. The resulting benzylidine derivative (a Schiff base) is then reduced to the corresponding secondary amino derivative by treatment with sodium borohydride. This results in the desired new chemical compound, i.e. the 1,4-bis-(disubstituted benzylaminomethyl)-cyclohexane. If desired it may be converted to a salt form, such as an acid addition salt of the base, by treatment with a suitable acid, such as hydrochloric acid. When hydrochloric acid is used the resulting salt forms of the base are dihydrochloride salts.

This sequence of reactions may be indicated schematically as follows:

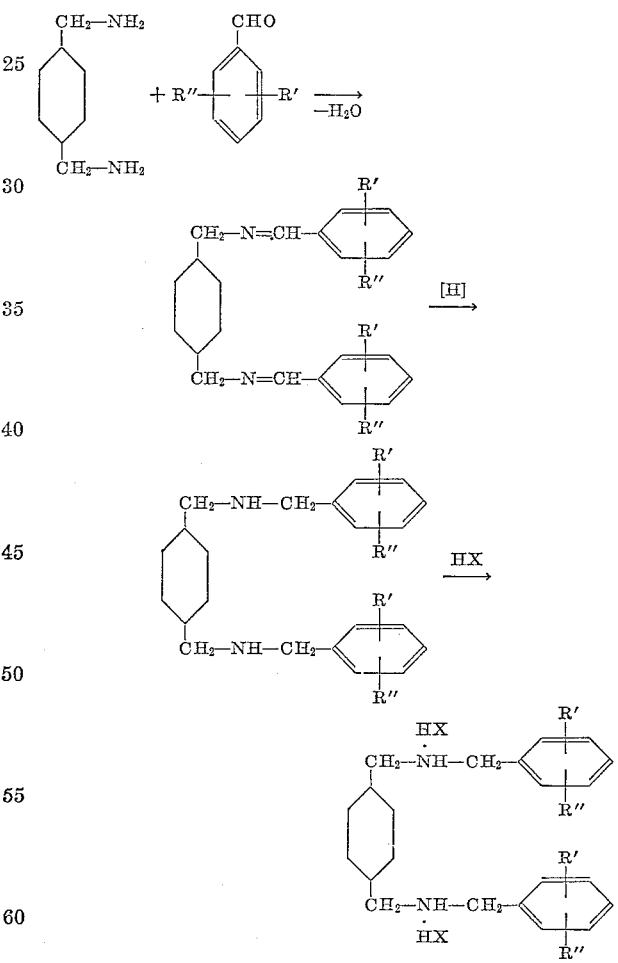

Many of the disubstituted benzaldehydes utilized as starting materials are commercially available. They may, however, be prepared from the correspondingly disubstituted anilines, if desired. The disubstituted aniline may be diazotized by treatment with sodium nitrite, and the resulting diazonium salt treated with aqueous formaldoxime to yield the oxime of the desired aldehyde. The disubstituted benzaldehydes are secured by hydrolysis of the oximes by treatment with hydrochloric acid.

Taking the preparation of a disubstituted benzaldehyde containing both chloro and methyl substituents, such as 2-chloro-5-methylbenzaldehyde, or 2-chloro-6-methylbenzaldehyde, as an example, this method of synthesis may be indicated schematically as follows:

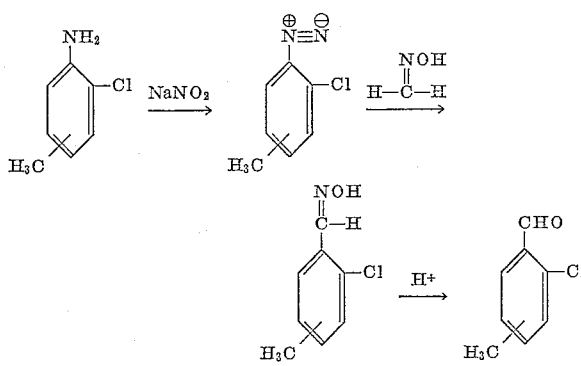

Taking typical compounds falling within the scope of my invention as illustrative, the following tabulations will indicate the biological properties possessed by the new compounds. In these tables:

Table I indicates results obtained in the in vitro determination of the inhibition of the biosynthesis of cholesterol.

Table II gives the results obtained upon administration of the compounds specified to rats, thereby lowering the cholesterol content of the blood of these rats. The dosages are specified in micromoles per kilogram of rat body weight, and the method of administration is also stated in the table.

Table III indicates the antibacterial activity of the compounds against various selected microorganisms. These results give the dilutions, for five representative compounds, at which dilutions the compounds are bactericidal against the microorganisms specified.

Table IV is a similar table, giving dilutions at which the specified compounds are effective against *Trichomonas vaginalis*, C–1 strain.

Finally, Table V indicates the fungistatic activity, at the dilutions specified, of various representative chemical compounds falling within the scope of my invention. The organisms against which the chemical compounds were tested are given in this table.

In all of these tables the compounds tested, as specified by Roman numerals in the tables, were the following:

Compound I—1,4-bis-(2,6-dichlorobenzylaminomethyl)-cyclohexane.
Compound II—1,4-bis-(2,4-dichlorobenzylaminomethyl)-cyclohexane.
Compound III—1,4 - bis - (3,4-dichlorobenzylaminomethyl)-cyclohexane.
Compound IV—1,4-bis-(2-chloro-5-methylbenzylaminomethyl)-cyclohexane.
Compound V—1,4 - bis - (2-chloro-6-methylbenzylaminomethyl)-cyclohexane.
Compound VI—1,4-bis-(3,4-dimethoxybenzylaminomethyl)-cyclohexane.
Compound VII—1,4 - bis - (3,4-dibenzyloxybenzylaminomethyl)-cyclohexane.

TABLE I.—INHIBITION OF CHOLESTEROL BIOSYNTHESIS (IN VITRO)

| Compound No. | Percent Inhibition | Concentration |
|---|---|---|
| II | 75 | $10^{-6}$M |
| III | 90 | $10^{-4}$M |

TABLE II.—CHOLESTEROL LOWERING ACTIVITY (RATS)

| Compound No. | Percent Lowering | Dose Level ($\mu$ moles/kg.) |
|---|---|---|
| II | 42 | 25 (subcutaneously). |
| III | 40 | 10 (subcutaneously). |
| I | 17 | 75 (orally). |
| IV | 10 | 75 (orally). |
| V | 48 | 75 (orally). |

TABLE III.—ANTIBACTERIAL ACTIVITY (1./MIC)[1]

| Organism | COMPOUND | | | | |
|---|---|---|---|---|---|
| | I | II | III | VI | VII |
| *Staph. pyogenes*[2] | 10,000 | 192,000 | 640,000 | >1,000 | 640,000 |
| *Staph. pyogenes*[3] | 10,000 | 192,000 | 640,000 | >1,000 | 640,000 |
| *Sarcina Lutea* | 10,000 | 384,000 | 1,280,000 | 4,000 | 20.4×10$^6$ |
| *Strep. faecalis* | 10,000 | 384,000 | 640,000 | >1,000 | 5.12×10$^6$ |
| *E. Coli* 198 | 10,000 | 384,000 | 320,000 | >1,000 | 40,000 |
| *Aer. aerogenes* | 10,000 | 80,000 | 320,000 | >1,000 | 16,000 |
| *S. pullorum* | 40,000 | 640,000 | 2,560,000 | 1,000 | 1.28×10$^6$ |
| *Ps. aeruginosa* | 10,000 | 24,000 | 160,000 | >1,000 | >1,000 |
| *Pr. mirabilis* | >10,000 | 6,000 | 80,000 | 1,000 | 16,000 |
| *Pr. vulgaris* | >10,000 | 6,000 | 80,000 | 1,000 | 8,000 |

[1] MIC: Minimum Inhibitory Concentration.
[2] A penicillin-sensitive strain.
[3] A penicillin-resistant strain.

TABLE IV.—TRICHOMONICIDAL ACTIVITY (*TRICHOMONAS VAGINALIS* C–1 STRAIN)

| Compound | 1./MIC([1]) |
|---|---|
| II | >10,000 |
| III | 40,000 |

[1] MIC: Minimum Inhibitory Concentration.

TABLE V.—FUNGISTATIC ACTIVITY (1./MIC)[1]

| Organism | Compound | |
|---|---|---|
| | VI | VII |
| *C. albicans* | 1,000 | 32,000 |
| *M. gypseum* | >1,000 | 16,000 |
| *Tr. granulosum* | 1,000 | 32,000 |

[1] MIC: Minimum Inhibitory Concentration.

My invention is further described in the illustrative examples which follow.

*Example 1*

1,4-BIS-(2,4-DICHLOROBENZYLAMINOMETHYL)-CYCLOHEXANE 2,4-dichlorobenzaldehyde (34.8 g.) and 1,4-bis-(aminomethyl)-cyclohexane (14.2 g.) were refluxed in benzene for six hours. The resulting Schiff base, a solid, was isolated and dissolved in a 1:1 benzene-methanol mixture. Sodium borohydride (6.5 g.) was added portionwise and the mixture refluxed for three hours. The title compound was isolated in the usual manner. It had M.P. 156–160° C.

A dihydrochloride was prepared and crystallized from methanol-ether. It had M.P. 308–309° C.

Analysis confirmed the empiric formula $C_{22}H_{30}N_2Cl_6$.

*Example 2*

1,4-BIS-(2,6-DICHLOROBENZYLAMINOMETHYL)-CYCLOHEXANE 2,6-dichlorobenzaldehyde (5.0 g.) and 1,4-bisaminomethyl-cyclohexane (2.0 g.) were converted to the Schiff base as described above. It was obtained in quantitative yield and had M.P. 142–144° C. It was suspended in methanol and treated portionwise with sodium borohydride (1.08 g.). The reaction mixture became homogeneous, was refluxed for three hours and worked up as described previously to yield the title compound (6.5 g.) M.P. 114–115° C. A dihydrochloride salt was prepared and crystallized from methanol-ether. It had M.P. 263–264° C.

Analysis confirmed the empiric formula $C_{22}H_{30}N_2Cl_6$.

*Example 3*

1,4-BIS-(3,4-DICHLOROBENZYLAMINOMETHYL)-CYCLOHEXANE 3,4-dichlorobenzaldehyde (0.2 mole) and 1,4-bis-(aminomethyl)-cyclohexane (0.1 mole) were converted to the corresponding Schiff base, a solid, by refluxing in benzene. The base was suspended in methanol and sodium borohydride (7.2 g.) was added in portions. As reaction proceeded, the mixture became homogeneous. The title compound was then isolated in the usual manner as an oil. In the ultraviolet it showed λmax. 264 mμ (ε=884), 273 mμ (ε=956) and 283 mμ (ε=826). It was converted to the dihydrochloride which was purified by trituration with hot methanol. It had M.P. 328–330° C.

Analysis confirmed the empiric formula $C_{22}H_{30}N_2Cl_6$.

*Example 4*

2-CHLORO-5-METHYLBENZALDEHYDE

A 10% aqueous formaldoxime solution, for use with 0.25 mole of the diazonium salt to be described below, was prepared as follows: paraformaldehyde (11.5 g., 0.383 mole) and hydroxylamine hydrochloride (26.3 g., 0.378 mole) were heated together in water (150 ml.) until a clear solution resulted. Hydrated sodium acetate (51 g.) was added and the mixture refluxed gently for 15 minutes. The buffered solution was then made up to a total volume of 172 ml. to yield a 10% solution.

A buffered solution of the diazonium salt (0.25 mole) of 2-chloro-5-methyl aniline was prepared in the following manner: 2-chloro-5-methyl aniline (36.0 g., 0.25 mole) was suspended at −5 to +3° C. in a mixture of concentrated hydrochloric acid (58 ml.), water (190 ml.) and ice (150 g.). To this mixture, which was cooled externally with an ice-salt bath, was added over a period of thirty minutes by a dropping funnel whose tip was under the surface of the mixture, a solution of sodium nitrite (18.0 g.) in water (26 ml.). As the diazonium salt was formed, a homogeneous solution resulted. This solution was made neutral to Congo red by the addition of hydrated sodium acetate (ca. 25 g.) in water (40 ml.).

The diazonium salt solution and the formaldoxime solution were reacted in the following manner: to the 10% aqueous formaldoxime solution was added anhydrous copper sulphate (260 mg.), sodium sulphite (1.0 g.) and additional hydrated sodium acetate (160 g.) in water (180 ml.). The mixture was cooled to 10–15° C. and to it was added with vigorous stirring over a period of ca. five minutes, the diazonium solution. This resulted in the formation of a gummy deposit on the wall of the reaction flask. The mixture was stirred for one hour at 10–15° C. then made acidic to Congo red with concentrated hydrochloric acid. An additional 230 ml. of concentrated hydrochloric acid was added and the mixture refluxed for two hours. The resulting solution was steam distilled and 2-chloro-5-methylbenzaldehyde was isolated by ether extraction. The residual aqueous solution was neutralized with solid sodium bicarbonate and extracted with ether. The combined ethereal extracts yielded 22.5 g. of the crude title compound.

The bisulphite addition complex was prepared by shaking the crude aldehyde with 90 ml. of 40% sodium metabisulphite ($Na_2S_2O_5$) solution at 60° C. It was separated by filtration, washed thoroughly with ether and decomposed by boiling with dilute sulphuric acid. The aldehyde was isolated by extraction with ether in 34% overall yield (13.2 g.).

A semicarbazone was prepared in the usual manner and crystallized from ethanol. It had M.P. 248–250° C.

Analysis confirmed the empiric formula $C_9H_{10}N_3OCl$.

1,4-BIS-(2-CHLORO-5-METHYLBENZYLAMINO-METHYL)-CYCLOHEXANE 1,4-bisaminomethylcyclohexane (5.2 g.) and 2-chloro-5-methylbenzaldehyde (11.3 g.) were converted to the Schiff base in benzene. It had M.P. 125–130° C. (ethanol), and was reduced to the title compound with potassium borohydride (3.9 g.). Working up in the usual manner yielded it as a solid, M.P. 122–123° C. A dihydrochloride salt was prepared and crystallized from methanol-ether. It had M.P. 275–276° C.

Analysis confirmed the empiric formula $C_{24}H_{34}N_2Cl_4$.

*Example 5*

2-CHLORO-6-METHYLBENZALDEHYDE

The compound 2-chloro-6-methylbenzaldehyde was prepared in exactly the manner described above for the 2-chloro-5-methyl analogue. It was obtained in 31% overall yield after distillation, B.P. 74° C. at 0.4 mm. of mercury pressure. The semicarbazone had M.P. 234–236° C. (d.)

Analysis confirmed the empiric formula $C_9H_{10}N_3OCl$.

1,4-BIS-(2-CHLORO-6-METHYLBENZYLAMINO-METHYL)-CYCLOHEXANE

The title compound was prepared as described above for the 2-chloro-5-methyl analogue. It had a M.P. of 105–107° C. on crystallization from methanol. The dihydrochloride salt was prepared and crystallized from dilute ethanol. It had M.P. 360° C.

Analysis confirmed the empiric formula $C_{24}H_{34}N_2Cl_4$.

*Example 6*

1,4-BIS-(3,4-DIMETHOXYBENZYLAMINO-METHYL)-CYCLOHEXANE 3,4-dimethoxybenzaldehyde (33.3 g.) and 1,4-bis-(aminomethyl)-cyclohexane were refluxed in benzene until the theoretical quantity of water had been removed azeotropically. The oily Schiff base was dissolved in methanol and treated with sodium borohydride (7.6 g.). Working up as previously described yielded the title compound as an oil, λmax. 230 mμ (ε=16,100), 281 mμ (ε=5,690).

It was converted to the dihydrochloride and crystallized from methanol-ether. It had M.P. 239–241° C.

Analysis confirmed the empiric formula $C_{26}H_{40}O_4N_2Cl_2$.

*Example 7*

1,4-BIS-(3,4-DIBENZYLOXYBENZYLAMINO-METHYL)-CYCLOHEXANE 3,4-bisbenzyloxybenzaldehyde (27.8 g., 0.086 mole) and 1,4-bis-(aminomethyl)-cyclohexane (6.1 g., 0.043 mole) were refluxed in benzene to yield the corresponding Schiff base which was suspended in methanol:benzene and treated portionwise with sodium borohydride, and refluxed for three hours. The title compound was isolated in the usual manner, λmax. 228 mμ (ε=19,200), 284 mμ (ε=5,320). It was converted to the dihydrochloride and crystallized from methanol-ether. It had M.P. 186–188° C.

Analysis confirmed the empiric formula $C_{50}H_{56}O_4N_2Cl_2$.

I claim:

1. A compound selected from the group which consists of bases of the formula

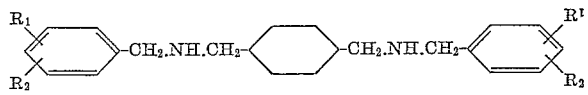

wherein $R_1$ and $R_2$ are each selected from the group of radicals consisting of methyl, methoxy, benzyloxy and chloro; and hydrochloric acid addition salts of said bases.

2. 1,4 - bis - (2 - chloro - 6 - methylbenzylaminomethyl)-cyclohexane.

3. 1,4 - bis - (2 - chloro - 5 - methylbenzylaminomethyl)-cyclohexane.

4. 1,4 - bis - (3,4 - dimethoxybenzylaminomethyl) - cyclohexane.

5. 1,4 - bis - (3,4 - dibenzyloxybenzylaminomethyl)-cyclohexane.

6. 1,4 - bis - (2,6 - dichlorobenzylaminomethyl) - cyclohexane.

7. 1,4 - bis - (2,4 - dichlorobenzylaminomethyl) - cyclohexane.

8. 1,4 - bis - (3,4 - dichlorobenzylaminomethyl) - cyclohexane.

9. The dihydrochloride salt of 1,4-bis-(2-chloro-6-methylbenzylaminomethyl)-cyclohexane.

10. The dihydrochloride salt of 1,4-bis-(2-chloro-5-methylbenzylaminomethyl)-cyclohexane.

11. The dihydrochloride salt of 1,4-bis-(3,4-dimethoxybenzylaminomethyl)-cyclohexane.

12. The dihydrochloride salt of 1,4-bis-(3,4-dibenzyloxybenzylaminomethyl)-cyclohexane.

13. The dihydrochloride salt of 1,4-bis-(2,6-dichlorobenzylaminomethyl)-cyclohexane.

14. The dihydrochloride salt of 1,4-bis-(2,4-dichlorobenzylaminomethyl)-cyclohexane.

15. The dihydrochloride salt of 1,4-bis-(3,4-dichlorobenzylaminomethyl)-cyclohexane.

References Cited in the file of this patent

UNITED STATES PATENTS

| | | |
|---|---|---|
| 2,709,700 | Szabo et al. | May 31, 1955 |
| 2,951,092 | Sowinski et al. | Aug. 30, 1960 |